(12) United States Patent
Oreper et al.

(10) Patent No.: US 6,225,814 B1
(45) Date of Patent: May 1, 2001

(54) CONTACT WIDTH SENSORS

(75) Inventors: Boris Oreper, Newton; Mark Lowe, Sharon; Charles McWilliams, Wellesley; Charles Malacaria, Medfield; Anthony Coviello, Tewksbury; Jay Winters, Andover, all of MA (US)

(73) Assignee: Tekscan, Inc, South Boston, MA (US)

( * ) Notice: Subject to any disclaimer, the term of this patent is extended or adjusted under 35 U.S.C. 154(b) by 0 days.

(21) Appl. No.: 09/290,288

(22) Filed: Apr. 13, 1999

(51) Int. Cl.$^7$ .............................. G01R 27/08; G01L 1/16
(52) U.S. Cl. ........................................ 324/713; 73/862.68
(58) Field of Search ................................. 324/713, 421, 324/525; 73/862.68; 33/772

(56) References Cited

U.S. PATENT DOCUMENTS 5,060,527 * 10/1991 Burgess .............................. 73/862.68

* cited by examiner

*Primary Examiner*—Safet Metjahic
*Assistant Examiner*—J. Kerveros
(74) *Attorney, Agent, or Firm*—Wolf, Greenfield & Sacks, P.C.

(57) ABSTRACT

This invention relates to apparatus for detecting the contact or nip width between two contacting surfaces. The apparatus includes first and second insulating substrates each of which has a pattern of conductive material formed on a facing inner surface thereof, which substrates are adapted to be fitted between the contacting surfaces. For a first embodiment, the pattern of conductive material on one substrate includes a pair of conductive terminals spaced by a distance greater than the contact width to be measured and the conductive pattern on the other substrate includes a conductor which extends over at least a distance greater than the maximum width W to be measured. A resistance path is provided between the conductive terminals having a resistance R0 which is higher than that of the conductor and material is provided in the space between the conductor and the resistance path which material substantially permits current flow therethrough between the conductor and the resistance path in areas where the contacting surfaces are not in contact and which has a resistance less than R0 permitting current flow therethrough in areas where the contact surfaces are in contact. Circuitry is also provided for applying current to one of the terminals and for utilizing the difference in current flow between the terminals to determine contact width. For a second embodiment, the conductive pattern on one substrate includes N substantially parallel and evenly spaced conductive columns and the pattern on the other substrate is a plurality of substantially parallel and evenly spaced rows. The columns are divided into M groups, where M is an integer which is at least 2, and each of the rows is at an angle $\theta$ to a line perpendicular to the columns when extending across alternate ones of the groups and at an angle $-\theta$ when extending across the remaining groups. The number of columns in each group is selected to achieve a desired resolution, and $\theta$ is selected so that the distance in the direction of the columns between the ends of a row for each group is substantially equal to the spacing between adjacent rows.

12 Claims, 2 Drawing Sheets

CONTACT WIDTH SENSORS

FIELD OF THE INVENTION

This invention relates to detecting contact between two surfaces, and more particularly to an apparatus for detecting the contact or nip width between such surfaces.

BACKGROUND OF THE INVENTION

There are many applications, such as with pinch rollers and seals, where it is desired that, at some minimum pressure, physical contact be made between two contacting surfaces over a selected width or distance. While in most instances such contact width could be assured by applying greater pressure, in many such applications it is desirable that the pressure applied not be substantially greater than that required to establish good contact over the desired width. There are also applications where information on contact width is required, sometimes with a resolution down to a fraction of a mil. In all such contact width determination applications, it is desirable that such determination be made quickly, with minimum interference with the mechanism having the contacting surfaces, with maximum flexibility, and at low cost.

Existing mechanisms for performing width determination do not meet all of these objectives. One technique used in the prior art is to mount sensors in one of the contacting surfaces of for example a pair of contacting pinch rollers, which sensors can be oriented to provide an indication of both contact width and contact location. However, because of the size of such sensors, it is difficult to achieve resolution of much less than 30 mils using this technique. The sensors are also difficult to mount and to replace and, once mounted, provide limited flexibility, such limited flexibility being achieved generally through external control circuitry and not through the sensors themselves.

Alternatively, matrix pressure sensor arrays, such as those taught in U.S. Pat. Nos. 4,856,993, 5,033,291, 5,505,072 and 5,756,904 may be utilized for performing this function, such a disposable matrix array being placed between the contacting surfaces for which width is to be measured, and a width determination being made by detecting the boundary rows of high pressure regions. However, since approximately 10 mils spacing between adjacent lines is currently the practical limit for printing conductive patterns and conductive ink patterns involving the technology of these patents, and since this resolution limit applies on both sides of a contact area, and there may be more than one contact area for a given measurement, the actual width resolution provided using this technique is typically at least 25 mils. This technique also involves a relatively expensive sensor array and scanning circuitry for determining contact points which then must be processed in a computer to determine contact width. This results in a relatively expensive array and a relatively time-consuming scanning process which, while advantageous in some applications in that it also provides a full pressure profile for the contacting surfaces, may be more expensive than is required for many applications.

A need therefore exists for improved techniques for performing contact width measurements and determination, which techniques provide higher resolution than is achievable using any existing technique and/or which are faster, more flexible, and/or less expensive than existing techniques.

SUMMARY OF THE INVENTION

In accordance with the above, this invention provides apparatus for measuring contact width between two contacting surfaces. The apparatus includes first and second insulating substrates having spaced facing inner surfaces and outer surfaces, the substrates being adapted to be fitted between contacting surfaces to measure contact width. A pattern of conductive material is formed on each of the facing inner surfaces, the patterns being spaced from each other and selectively overlapping.

For a first embodiment of the invention, the pattern of conductive material on the inner surface of one substrate includes a pair of conductive terminals spaced by a distance L, where L is greater than a contact width W to be measured, and the conductive pattern on the inner surface for the other substrate includes a conductor which extends over at least a distance greater than the maximum width W to be measured. A resistance path is provided between the conductive terminals, which path has a resistance R0, R0 being higher than the resistance of the conductor. Material is also provided in the space between the conductor and the resistance path which material has a high resistance, substantially preventing current flow therethrough between the conductor and the resistance path in areas where the conducting surfaces is not in contact and which has a lower resistance less than R0 between the conductor and resistance path in areas where the conducting surfaces are in contact. Finally, circuitry is provided for applying current to one of the terminals and for utilizing a difference in current flow between the terminals to determine contact width between the contacting surfaces. For preferred embodiments, the resistance path includes a first layer in contact with the spaced terminals and having the substantially fixed resistance R0. The material layer may for example be an air gap or may be a layer of pressure sensitive material having the high resistance in the absence of pressure and the low resistance when at least a selected minimum pressure is applied thereto.

For this embodiment, the circuitry may include circuitry for applying a constant current across the conductive terminals and for measuring the voltage across the terminals when there is contact between the contacting surfaces, such voltage being indicative of contact width. Alternatively, the circuitry may include a bridge circuit having fixed resistors in two legs, resistances proportional to the resistance between the terminals in two other legs, a constant current applied across two terminals of the bridge and a voltage output across two other terminals of the bridge, the voltage output being proportional to the contact width to be measured.

Finally, this embodiment of the invention may also include a mechanism for measuring pressure between the contacting surfaces which mechanism may include at least one additional layer adjacent an outside surface of a substrate or additional circuitry on the substrates, with pressure-sensitive material positioned between such additional circuitry, either of such mechanisms providing a pressure indication.

For an alternative embodiment of the invention, the pattern of conductive material on the inner surface of one substrate includes N substantially parallel and evenly spaced conductive columns, and the pattern on the inner surface of the other substrate is a plurality of substantially parallel and evenly spaced rows. The columns are divided into M groups, where M is an integer which is at least 2, and each of the rows is at an angle θ to a line perpendicular to the columns when extending across alternate ones of the groups and at an angle −θ when extending across the remaining groups. The number of columns in each group is selected to achieve a desired resolution for the apparatus, and θ is selected so that the distance in the direction of the columns between the ends of a row for each group is substantially equal to the spacing between adjacent rows. For a preferred embodiment, M=4 and there are 10 columns in each of the groups, resulting in resolution being improved by a factor of 10 over what resolution would be if the rows were not angled.

The foregoing and other objects, features and advantages of the invention will be apparent from the following more particular description of preferred embodiments of the invention as illustrated in the accompanying drawings.

IN THE DRAWINGS

DETAILED DESCRIPTION

Figure 1A:
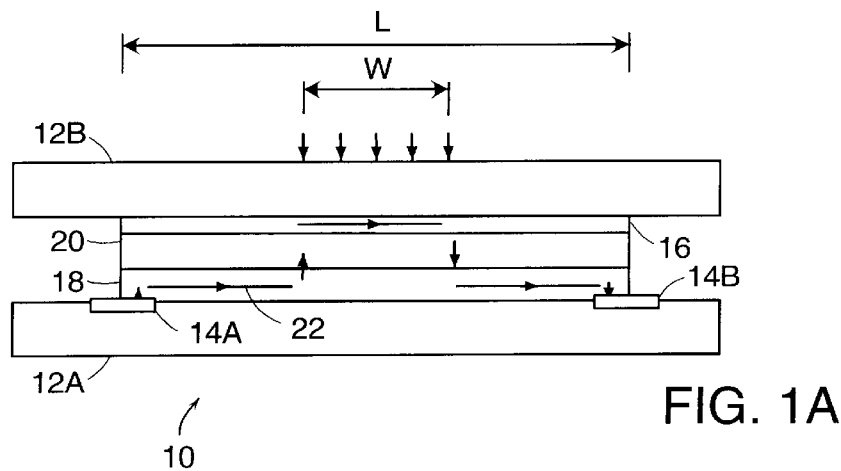
FIG. 1A is a cutaway side view of a contact width measuring apparatus in accordance with a first embodiment of the invention.
Figure 1B:
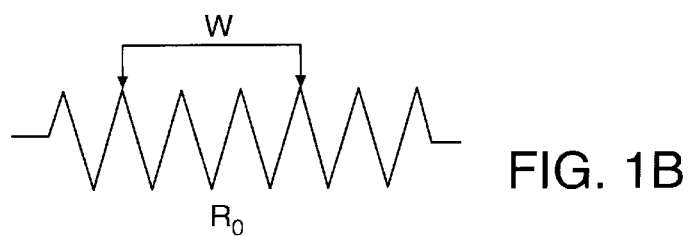
FIG. 1B is an equivalent circuit representation for the apparatus of FIG. 1A.
Figure 1C:
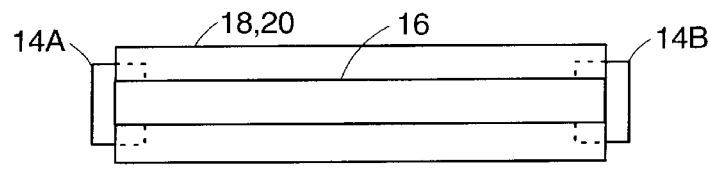
FIG. 1C is a top view of the apparatus shown in FIG. 1A with the substrates removed.

Referring first to FIGS. 1A–1C, the width measuring device 10 for the first embodiment of the invention includes a pair of substrates or carriers 12A, 12B of insulating material which substrates are substantially parallel to each other and spaced by a selected distance. Substrate 12A has a pair of conductive terminals 14A, 14B formed on an inner surface thereof, and substrate 12B has a conductive layer 16 formed on its inner surface. As may be best seen in FIG. 1C, conductive layer 16 overlays portions of each of the terminals 14A, 14B and extends between them. The conductive layer has a length L as shown in FIG. 1A which length is greater than the width W of any contacting surfaces which are to have their width measured by the apparatus. A first resistive layer 18 and a second resistive layer 20 are formed between conductive layers 14 and 16. Layers 18 and 20 may both be formed of resistive ink, resistive layer 20 being preferably of a pressure-sensitive resistive ink, the resistance across which is high enough so as to be a substantial open circuit when no pressure is applied to the resistive ink and being low enough so as to be a substantial short circuit when pressure is applied thereto. Resistive layer 18 can have a substantially constant resistance which is low enough so that current may flow therethrough from terminal 14A to terminal 14B, but substantially higher than the resistance across layer 20 when pressure is applied thereto. All of the layers are thin enough and flexible enough so that when there is contact between two contacting surfaces for which it is desired to measure the contact width W, deformation occurs substantially only over the width W so that there is little or no edge effect for width determination. Alternatively, variable resistance layer 20 may be an air gap of suitable width so that when there is contact with at least a minimum pressure, conductive layer 16 makes electrical contact with layer 18 in the contact area.

In operation, a constant current 10 is normally applied to one of the terminals 14, for example terminal 14A, and the other terminal, for example terminal 14B, is at ground or some other known potential. This causes current to flow through resistive layer 18 from terminal 14A to terminal 14B, the resistance in layer 18 between the terminals 14 in the absence of contact being $R_0$. However, when contact with at least a minimum pressure occurs over a width W, the portion of variable resistance layer 20 underlying the contact area W has a substantial short circuit thereacross, permitting current over this area to flow to and through conductor 16 rather than through resistive layer 18. This effect is illustrated by current path 22 in FIG. 1A and by the equivalent circuit shown in FIG. 1B, the resistance for path 22 being a value $R_1$, where $R_1$ is less than $R_0$, and the contact width W is proportional to $(R_0-R_1)$. In particular, $$R_0 = \rho L / A \qquad (1)$$

$$R_1 = \rho \frac{(L-W)}{A} \qquad (2)$$

$$R_0 - R_1 = \Delta R = R_0 \times \frac{W}{L} \qquad (3)$$

$$W = \frac{\Delta R L}{R_0} \qquad (4)$$

where $\rho$ is the resistivity of layer 18 and A is the cross-sectional area of layer 18.

Figure 3:
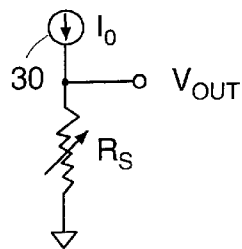
FIG. 3 is a schematic diagram of circuitry for detecting the output from the device of FIG. 1A.

In practice, the apparatus shown in FIG. 1A may be a thin strip of material, for example 3 to 5 mils thick, which may be placed between the surfaces for which contact is to be measured. Leads may extend from terminals 14A and 14B which are connected to suitable detection circuitry. For example, referring to FIG. 3, a constant current source 30 may apply current to terminal 14A, while terminal 14B is connected to ground. The resistance $R_S$ between these terminals is, as discussed above, a function of contact width W, and this resistance may be measured by detecting $V_{OUT}$ at terminal 14A. In particular:

$$V_{OUT} = V_0 - KW \qquad (5)$$

where $V_0 = I_0 R_0$ and $$K = \frac{I_0 R_0}{L}.$$

Thus, $$W = \frac{V_0 - V_{OUT}}{K} = L - \frac{V_{OUT}}{I_0 R_0} = \frac{L \Delta R}{R_0} \qquad (6)$$

From equation (6), since K is a constant value, a $V_{OUT}$ reading may be easily converted into a contact width value by either special purpose analog or digital circuitry, by a suitably programmed digital processor, or by hybrid circuitry.

Figure 2:
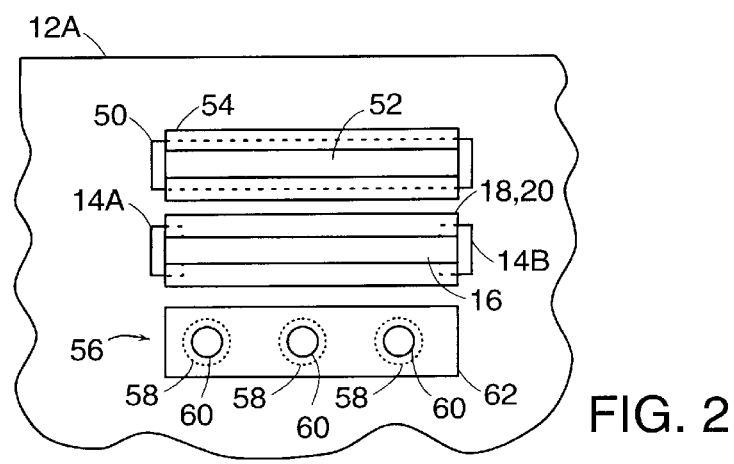
FIG. 2 is a top view with the top substrate removed for an alternative embodiment of the invention.
Figure 4A:
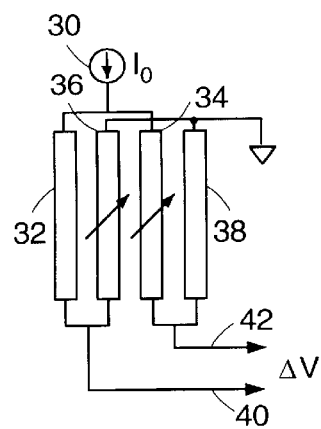
FIG. 4A is a diagrammatic representation of alternative circuitry for use in conjunction with the measuring apparatus of FIG. 1A.
Figure 4B:
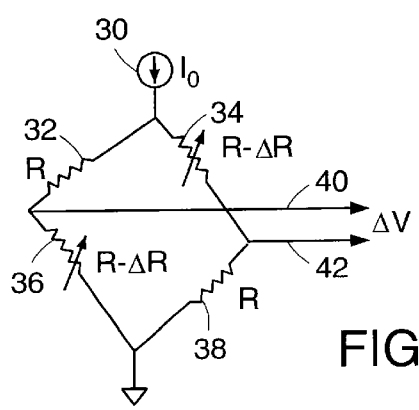
FIG. 4B is a schematic representation of the circuitry shown in FIG. 4A.

One problem with the circuit shown in FIG. 3A is that resistance Rs may also vary as a result of environmental factors, for example changes in temperature, so that $V_{OUT}$ may not always be a precise indication of contact width. Therefore, for high accuracy applications, a bridge circuit such as that shown in FIGS. 4A and 4B is preferable. For this embodiment of the invention, constant current from source 30 is applied to two resistances 32 and 34, resistance 32 being fixed and preferably not positioned between substrates 12A and 12B while resistance 34 is variable and is a resistance configuration such as that shown in FIGS. 1A and 1C. A second variable resistance 36 and a second fixed resistance 38 are connected at one side to ground. The second variable resistance 36 may for example be a second conductive/resistive array formed on substrates 12A, 12B adjacent the array shown in FIG. 1C, much as multiple adjacent arrays as shown in FIG. 2 to be discussed shortly. The other side of resistors 32 and 36 are connected to a first output terminal 40, and the other side of resistances 34 and 38 are connected to a second output terminal 42. For the bridge array shown in FIGS. 4A, 4B, ΔV cross output lines 40, 42 is given by, $$\Delta V = \frac{I_0 \Delta R}{2} \quad (7)$$

Thus, $$W = \frac{L\Delta R}{R_0} = \frac{2L\Delta V}{I_0 R_0} = \frac{2\Delta V}{K} \quad (8)$$

Thus, W can be easily determined from the reading of ΔV using simple dedicated analog or digital circuitry, a suitably programmed processor or hybrid circuitry.

While the embodiment shown in FIGS. 1A–1C measures contact width, which is all that is required to be measured in many applications, there are applications where an indication of the pressure applied between the contacting surfaces may also be desired. One way which such pressure measurement may be accomplished is to place one or more terminals on an outer surface of one of the substrates 12, for example the substrate 12A, cover such terminals with variable resistance ink, and sandwich the variable resistance ink between the terminals on the outer surface of substrate 12 and terminals formed on an additional substrate (not shown). The measuring apparatus would thus have two layers, one measuring contact width and one measuring pressure.

FIG. 2 shows an alternative configuration where, in addition to terminals 14, conductor 16 and resistance layers 18 and 20 shown in FIG. 1C, there is at least one additional electrode formed on each substrate, with a variable resistance layer therebetween, for performing pressure measurements. In FIG. 2, two different such configurations are shown for purposes of illustration, but, in practice, if two pressure measuring sets of electrodes were employed, they would normally be of the same type. In particular, one pressure sensor has a first electrode 50 formed on substrate 12A and a second electrode 52 formed on substrate 12B, which electrodes are separated by a variable resistance layer 54. While in the Figure, the electrodes are shown as being of different size, that is done primarily for convenience of illustration, and all that is required is that there be substantial overlap between the electrodes. As with standard pressure sensors, a voltage could be applied to one of the electrodes and be sensed at the other electrode, the voltage at the output electrode being indicative of the pressure being applied to the sensor. The second sensor 56 shown in FIG. 2 is made up of three button sensors each having a terminal 58 on substrate 12A and a terminal 60 on substrate 12B, with a layer 62 of variable resistance material therebetween. The three button sensors of configuration 56 would permit some profiling of the pressure being applied.

Figure 5:
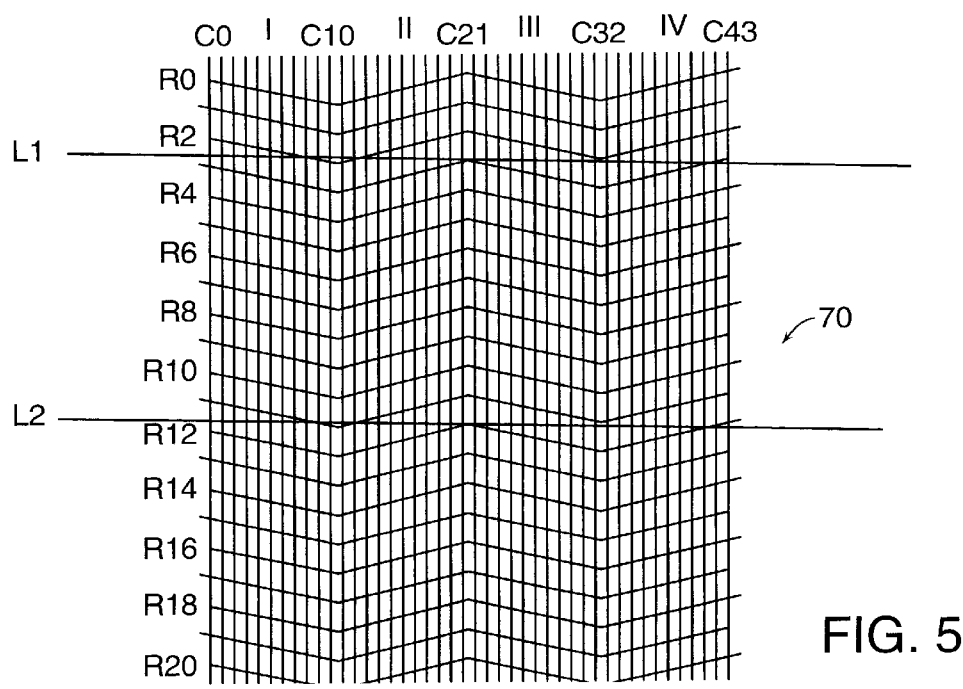
FIG. 5 is a top view of width measuring apparatus in accordance with an alternative embodiment of the invention with the substrates removed.

FIG. 5 shows an alternative embodiment of the invention which is similar to the sensors shown in the aforementioned patents (which patents are incorporated herein by reference) except that it is capable of providing higher resolution for a width determination than is possible with these prior art devices. In particular, the sensor 70 which is placed between the contacting surfaces has a plurality of columns C0–C43 formed on one of its substrates and a plurality of rows R0–R20 formed on the other substrate (the substrates not being shown for convenience of illustration). Pressure-sensitive variable resistance ink is formed on at least one set of electrodes in the manner discussed in the prior patents so that the resistance between each intersecting pair of columns and rows is a function of the pressure applied to the array at such intersection. While a separate line may be brought out from the array at each intersecting point, the arrays are preferably scanned in order to detect the resistance, and thus the pressure, at each intersection, the scanning being performed using one of the techniques discussed in the prior patents.

However, 10 mils separation is the practical limit for printing conductive leads and pressure sensitive ink on substrates of the type disclosed in the prior patents, and the spacing between the leads is typically significantly greater. However, in some applications, precise width measurements to a resolution of 5 mils or less, may be desired. The embodiment of FIG. 5 teaches a technique for achieving such enhanced resolution.

In particular, the columns are divided into four groups, each containing eleven electrodes. Each of the rows is at an angle θ to the horizontal when extending between rows C0 and C11 and when extending between rows C21 and C32, and it is at an angle −θ when extending between rows C11 and C22 and when extending between columns C32 and C43. This means that the vertical position indicated by the intersection of a given row and column is different for each column of a given group with which the row intersects. By selecting the number of columns in each group to achieve a desired resolution and by selecting the angle θ such that the difference in vertical position for a given row for a given group from one end of the group to the other end in the group is substantially equal to the spacing between the rows, the resolution may be improved by a factor of F where F is equal to the number of columns in each group. Thus, if it is assumed that the spacing between each pair of adjacent columns is 20 mils, the spacing between each pair of adjacent rows is 50 mils and that there are ten columns C in each group, then $$\tan\theta = \frac{50}{200} = \frac{1}{4} = 0.25 \quad (9)$$

and θ=14°. This would give a resolution of 5 mils (i.e., 50/F=50/10=5). For the same spacing of columns and rows, but with only five columns per group, 10 mils resolution could be achieved with a θ=26.5°.

By detecting the crossing point (i.e., the point where the resistance drops sharply) which is closest to the top of the array, the L1 position can be determined within each group. However, this information may not be completely accurate if the contact line L1 is not exactly perpendicular to the columns and, under the worst case scenario, where the contact line L1 is at the same angle θ as the rows, would prevent detection of contact altogether. Therefore, at least two oppositely angled sections are preferred, and four sections are shown for the preferred embodiment to provide more accurate readings. The highest contact point in each group of columns is determined and a best fit line drawn through these points using standard techniques to determine the contact line L1. Contact line L2 would be determined in similar fashion by detecting a low resistance intersection in each group which is closest to the bottom of the array and drawing a best fit line L2 through these intersections. The desired width W is the distance between the lines L1 and L2. The configuration of FIG. 5 is advantageous in that it provides a complete pressure profile in addition to providing width indications. However, this configuration is more expensive both to fabricate and to use and would therefore generally be used only in applications where a very high resolution is required for the width determination and/or a pressure profile is also required.

While the invention has been particularly shown and described above with reference to a number of embodiments and variations thereon have also been discussed, it is to be understood that these embodiments are for purposes of illustration only and that the foregoing other changes in form and detail may be made therein by one skilled in the art without departing from the spirit and scope of the invention which is to be defined only by the appended claims.

What is claimed is:

1. Apparatus for measuring contact width between two contacting surfaces including:

first and second insulating substrates having spaced facing inner surfaces and outer surfaces, said substrates being adapted to be fitted between said contacting surfaces;

a pair of conductive terminals formed on the inner surface of one of said substrates which terminals are spaced by a distance L, where L is greater than a contact width W to be measured;

a conductor formed on the inner surface of the other substrate which extends between said terminals over at least a distance greater than the maximum width W to be measured;

a resistance path between said conductive terminals having a resistance R0 which is higher than that of said conductor;

material in the space between said conductor and said resistance path which material has a high resistance which substantially prevents current flow therethrough between said conductor and resistance path in areas where said contacting surfaces are not in contact and which has a resistance less than R0 between said conductor and resistance path in areas of said contacting surfaces which are in contact; and circuitry for applying a signal to one of said terminals and for utilizing a differences in current flow between said terminals to determine contact width between said contacting surfaces.

2. Apparatus as claimed in claim 1, wherein said resistance path includes a first layer in contact with said spaced terminals and having said substantially fixed resistance R0.

3. Apparatus as claimed in claim 2, wherein said material is an air gap.

4. Apparatus as claimed in claim 2, wherein said material is a layer of pressure sensitive material having said high resistance in the absence of pressure and said low resistance when at least a selected minimum pressure is applied thereto.

5. Apparatus as claimed in claim 1, wherein said circuitry includes circuitry for applying a constant current across said conductive terminals and for measuring the voltage across said terminals when there is contact between said contacting surfaces, said voltage being indicative of the contact width.

6. Apparatus as claimed in claim 1, wherein said circuitry includes a bridge circuit having fixed resistors in two legs, resistances proportional to the resistance between said terminals in two other legs, a constant current applied across two junctions thereof, and a voltage output across two other junctions thereof, said voltage output being proportional to the contact width.

7. Apparatus as claimed in claim 1, including a mechanism for also measuring contact pressure between said contacting surfaces.

8. Apparatus as claimed in claim 7, wherein said mechanism includes at least one additional layer adjacent one of said outside surfaces of a substrate for measuring pressure between said contacting surfaces.

9. Apparatus as claimed in claim 7, wherein said mechanism includes at least one additional conductive land on the inner surface of each substrate, which lands overlap and have pressure sensitive material therebetween.

10. Apparatus for measuring contact width between two contacting surfaces including:

first and second insulating substrates having spaced facing inner surfaces and outer surfaces, said substrates being adapted to be fitted between said contacting surfaces;

N substantially parallel and evenly spaced conductive columns formed on the inner surface of one of said substrates and a plurality of substantially parallel and evenly spaced rows formed on the inner surface of the other substrate, the columns being divided into M groups, where M is an integer which is at least 2, and wherein each of the rows is at an angle θ to a line perpendicular to said columns when extending across alternate ones of said groups and at an angle −θ when extending across remaining groups, the number of columns in each group being selected to achieve a desired resolution, and θ being selected so that the distance in the direction of the columns between the ends of a row for each group is substantially equal to the spacing between adjacent rows;

material in the spaces between the inner surfaces of the substrates at least at each intersection of a row and column, which material has a high resistance which substantially prevents current flow therethrough in areas where said contacting surfaces are not in contact and which has a low resistance between areas of said contacting surfaces which are in contact; and circuitry for utilizing the resistance differences in said material to determine contact width between said contacting surfaces.

11. Apparatus as claimed in claim 10, where M=4.

12. Apparatus as claimed in claim 10, where there are ten columns in each of said groups.

* * * * *